United States Patent [19]

Hamner

[11] 4,051,021
[45] Sept. 27, 1977

[54] HYDRODESULFURIZATION OF HYDROCARBON FEED UTILIZING A SILICA STABILIZED ALUMINA COMPOSITE CATALYST

[75] Inventor: Glen P. Hamner, Baton Rouge, La.

[73] Assignee: Exxon Research & Engineering Co., Linden, N.J.

[21] Appl. No.: 685,500

[22] Filed: May 12, 1976

[51] Int. Cl.² .............................................. C10G 23/02
[52] U.S. Cl. ................................ 208/216; 252/455 R; 252/458
[58] Field of Search ............................... 208/216, 211

[56] References Cited

U.S. PATENT DOCUMENTS

| | | | |
|---|---|---|---|
| 3,340,180 | 9/1967 | Beuther et al. | 208/216 |
| 3,471,399 | 10/1969 | O'Hara | 208/216 |
| 3,770,618 | 11/1973 | Adams et al. | 208/216 |
| 3,814,682 | 6/1974 | Christman et al. | 208/216 |
| 3,814,683 | 6/1974 | Christman et al. | 208/216 |
| 3,814,684 | 6/1974 | Christman et al. | 208/216 |
| 3,902,991 | 9/1975 | Christensen et al. | 208/211 |

*Primary Examiner*—George Crasanakis
*Attorney, Agent, or Firm*—Llewellyn A. Proctor

[57] ABSTRACT

A hydrodesulfurization process (and catalyst) wherein a sulfur-containing hydrocarbon feed is contacted, in the presence of hydrogen, with a catalyst having greater than 50 percent of its total pore volume of absolute diameter ranging from about 70A to about 160A. Preferably, the total pore volume of the catalyst contains greater than 70 percent of its total pore volume within the 70A to 160A pore diameter range, and more preferably greater than 90 percent of its total pore volume is within the 70A to 160A pore diameter range, with pore diameters below 70A and above 160A being minimized. The pore volume of such catalysts range between about 0.3 cc/g and 1.0 cc/g (B.E.T.), and preferably from about 0.4 cc/g to about 0.8 cc/g. The surface area of such catalysts range between about 150 m²/g and 450 m²/g, preferably from about 200 m²/g to about 400 m²/g.

6 Claims, 1 Drawing Figure

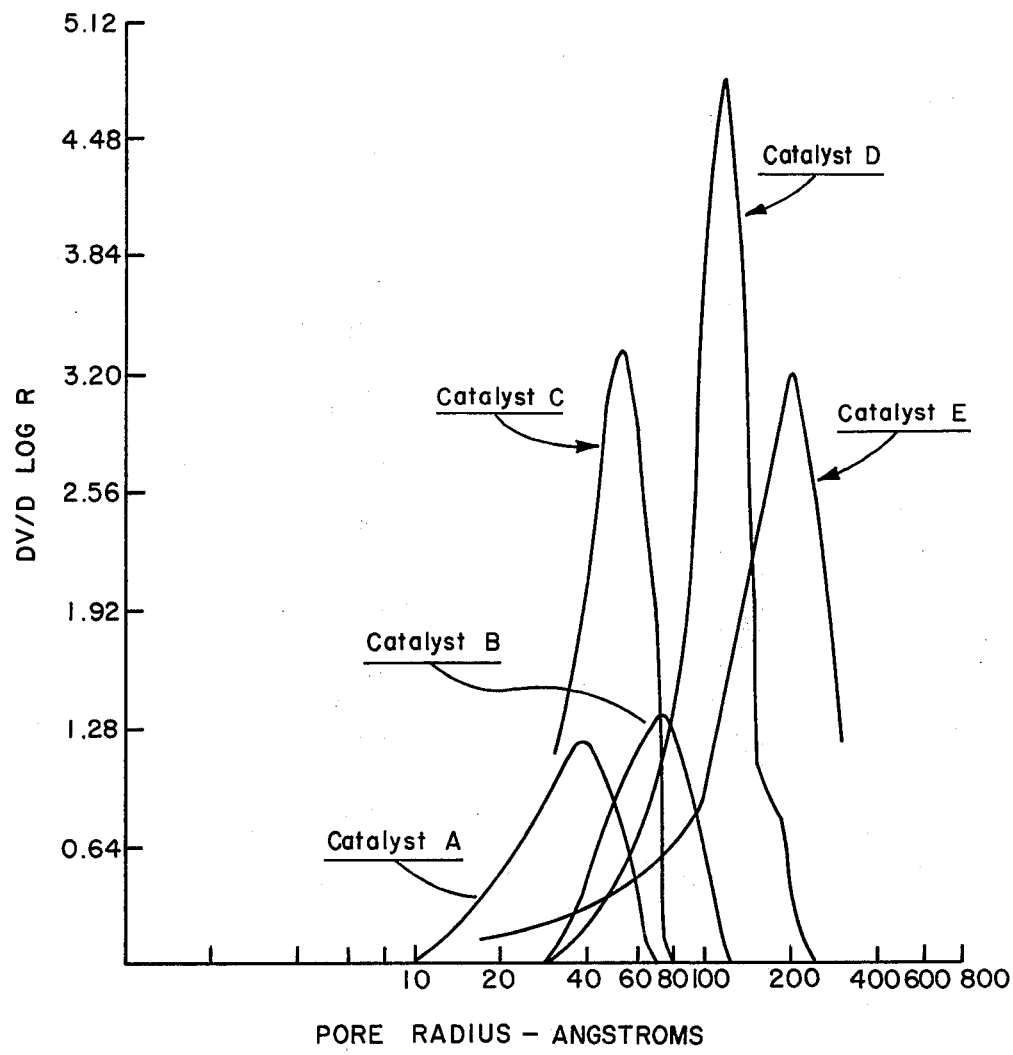

HYDRODESULFURIZATION OF HYDROCARBON FEED UTILIZING A SILICA STABILIZED ALUMINA COMPOSITE CATALYST

Numerous prior art references describe processes for hydrotreating hydrocarbon feedstocks, particularly hydrodesulfurization processes wherein hydrocarbon oil fractions, including light, middle and residual distillate fractions or even whole crudes and residua are treated with hydrogen over a wide range of elevated hydrogen pressures and temperatures in the presence of catalyst composites containing a hydrogenation-dehydrogenation component comprised of a metal or compounds of a metal, or metals, of Group VI and/or Group VIII, of the Periodic Table of the Elements (Sargent-Welch Scientific Company, printed in the U.S.A., copyright 1968). In such reactions the carbon-sulfur bonds of the molecules constituting the feed are broken and sulfur-containing moities react with hydrogen to produce hydrogen sulfide. The resulting hydrocarbon stream, reduced in its sulfur content, is separated from the residual mixture of hydrogen and hydrogen sulfide gases.

Processes for hydrodesulfurizing heavy hydrocarbon feedstocks, e.g. petroleum residua, are particularly difficult to operate, much more so than those which treat the lighter feedstocks. This is because petroleum residua, or even coker gas oil, vacuum gas oil and petroleum crude, contain (1) asphaltenes and other high molecular weight, aromatic structures which severely inhibit the rate of hydrodesulfurization and cause catalyst deactivation, (2) ash-forming constituents, such as metallo-organic compounds, which decompose and cause catalyst contamination and deactivation, and even interfere with catalyst regeneration, and (3) relatively large quantities of sulfur as contrasted with the lighter feeds, this giving rise to objectionable emissions of sulfur dioxide and sulfur trioxide upon combustion of such fuels in industrial furnaces. Ecological considerations, reflected in part by governmental demands, require elimination of sulfur from such feeds, but this can be accomplished only in the face of extreme difficulty due to the presence of the asphaltenes and ash-forming constituents. High operating costs associated with the problems of catalyst deactivation, short catalyst life and high hydrogen consumption have, until recent years, hindered commercial utilization of such processes. Present energy demands, however, demand utilization of these materials for use in the production of fuels.

In recent years catalysts have been developed which are sufficiently active to meet the requirements of a commercial process for hydrodesulfurizing petroleum feeds of such character, e.g. such as described in U.S. Pat. No. 3,509,044 by Clark E. Adams et al, patented Apr. 28, 1970. These catalysts, whereas they include the same metal hydrogenation component, compound or compounds, as part of the catalyst composite, are characterized, inter alia, as having a maximum surface area ($>50\%$) in pores of diameters ranging 30 to 80A, with a minimum of pores with diameters ranging above 100A. The support material, or base, comprises from about 1 to about 6 percent silica and from about 94 to about 99 percent alumina, based on the weight of the total catalyst. The improved activity of these catalysts is predicated on the theory of a "screen door" effect, i.e., a phenomenon which permits entry of relatively small molecules into the pores with simultaneous inhibition of the entry of relatively large molecules. Hence, it is predicated that there is less deactivation produced by heavy metals deposition within the catalyst pores.

Various other hydrodesulfurization catalysts have been developed of even larger pore size distribution, a handfull of which may have proven adequate for commercial usage. For example U.S. Pat. No. 3,471,399 discloses a hydrodesulfurization catalyst comprised of silica alumina having an average pore diameter ranging from 70 to 90A; U.S. Pat. No. 3,393,148 discloses a hydroprocessing catalyst comprised of a hydrogenation component of average pore diameter ranging from 100 to 200A; U.S. Pat. No. 3,876,523 discloses a hydrodemetallization and hydrodesulfurization catalyst having an average pore diameter between 150 and 250A; and U.S. Pat. No. 3,891,541 discloses a catalyst otherwise similar except the pores are of pore diameters ranging from 180 to 300A.

Whereas, e.g., on the one hand, the Adams et al catalyst has proven admirably suitable for desulfurization of hydrocarbon, and has achieved commercial prominence, it nonetheless does not completely desulfurize such feedstocks. Moreover, increased severities brought about by changes in process conditions cause more rapid catalyst deactivation. On the other hand, the larger pore size catalysts are all to rapidly deactivated as process temperatures are progressively elevated to compensate for activity loss.

It is, accordingly, among the objects of this invention:

To obviate these and other prior art disadvantages by providing a further improved hydrodesulfurization process, notably a hydrodesulfurization process which utilizes a new and improved catalyst.

To provide a process which utilizes a new and improved catalyst which produces greater hydrodesulfurization and improved activity maintenance.

To provide a new and improved hydrodesulfurization catalyst, particularly one having superior activity and activity maintenance.

These and other objects are achieved in accordance with the present invention which comprises a hydrodesulfurization process, and catalyst, wherein a sulfur-containing hydrocarbon feed, notably a hydrocarbon oil fraction, including light, middle and residual distillate fractions and whole crudes and residua, is contacted, in the presence of hydrogen, with a catalyst having greater than 50 percent of its total pore volume of absolute diameter ranging from about 70A to about 160A. Preferably, the total pore volume of the catalyst contains greater than 70 percent of its total pore volume within the 70A to 160A pore diameter range, and more preferably greater than 90 percent of its total pore volume is within the 70A to 160A pore diameter range, with pore diameters below 70A and above 160A being minimized. The pore volume of such catalysts range between about 0.3 cc/g and 1.0 cc/g (B.E.T.), and preferably from about 0.4 cc/g to about 0.8 cc/g. The surface area of such catalysts range between about 150 $m^2$/g and 450 $m^2$/g, preferably from about 200 $m^2$/g to about 400 $m^2$/g.

In its more specific aspects the catalysts are characterized as follows:

| Distribution of Pore Diameters[1] | Marginal | Preferred | More Preferred |
|---|---|---|---|
| 0 – 50A | <3 | <1 | 0 |
| 50 – 70A | <22 | <24 | <8 |
| 70 – 160A | >50 | >70 | >90 |

-continued

| Distribution of Pore Diameters[1] | Marginal | Preferred | More Preferred |
|---|---|---|---|
| 160 - 200A | <15 | <5 | <2 |
| 200A+ | 10 | 0 | 0 |
| Pore Vol. cc/g | 0.35 -1.0 | 0.4 -0.9 | |
| 0.5 -0.8 | | | |
| Surface Area m$^2$/g | 150 -450 | 200 -400 | 250 -350 |

[1]Measured by nitrogen adsorption isotherm, wherein nitrogen adsorbed is at various pressures. Technique described in Ballou, et al, Analytical Chemistry, Vol. 32, April, 1960, using Aminco Adsorptomat [(Catalogue No. 4-4680) and Multiple Sample Accessory (Catalogue No. 4-4685) InstructionNo. 861-A] which uses the principle of adsorption and desorption of gas by a catalyst specimen at the boiling point of nitrogen.

The catalysts comprise a composite of an inorganic oxide base with a hydrogenation-dehydrogenation component, suitably metal or compound of a metal, or metals, especially one selected from Group VIB and/or Group VIII of the Periodic Table of the Elements. In general, the concentration of the Group VIB metal ranges from about 5 to about 30 percent, and the Group VIII metal, notably a non-noble metal, ranges from about 1 to about 12 percent, based on the weight of the catalyst (measured as an oxide). The preferred active metallic component is comprised of an oxide or sulfide of nickel or cobalt, particularly the latter, and an oxide or sulfide of molybdenum or tungsten. The catalyst base can be alumina stabilized with silica in concentration ranging up to about 6 percent, and 94 to 99 percent alumina.

The composition of the preferred catalysts, in weight percent, are summarized as follows:

| | Range of Compositions | |
|---|---|---|
| | Typical | Preferred |
| Nickel or cobalt (as oxide) | 1-15 | 2-10 |
| Molybdenum or tungsten (as oxide) | 5-25 | 10-20 |

In accordance with a preferred mode of practicing the present invention, a sulfur-containing petroleum residuum feed, or feed containing generally from about 2 to about 6 percent sulfur by weight, is preheated to reaction temperature and passed, with hydrogen, in concurrent flow, downwardly through a multiple fixed bed reactor. The several beds of the reactor, containing fixed beds of catalyst, are separated one from the other. Suitably, if desired, a water quench can be injected into the spaces between the beds (reaction zones). As the run progresses, the temperature of reaction is gradually raised to maintain substantially constant catalyst activity. The effluent from the reactor is fed to a high temperature-high pressure separator for further removal of hydrogen, hydrogen sulfide, and light ends. Desulfurized liquid product from the separator is then passed to a stripper wherein steam is injected for further separation of hydrogen sulfide and liquid product. Finished desulfurized product, after separation from the water, is removed from the bottom of the stripper.

The gaseous effluent from the high temperature-high pressure separator—viz., hydrogen, hydrogen sulfide, and light gases—is fed to a scrubber wherein the hydrogen sulfide is removed by contact with an alkaline medium, e.g., methylethylamine. The effluent from the scrubber, chiefly hydrogen, is recycled with makeup hydrogen to the process.

The hydrocarbon feeds which can be hydrodesulfurized pursuant to the practice of this invention include coal liquids, whole heavy crude and residua and are of generally the following characteristics:

| | Typical Range | Preferred Range |
|---|---|---|
| Gravity, ° API | −5 to 30 | 5 - 20 |
| Sulfur, Wt. % | 0.02 -6.0 | 0.2 - 3.5 |
| Nitrogen, Wt. % | 0.05 -2.0 | 0.1 - 1.0 |
| Heavy Metals (Ni & V), ppm | 0 - 1000 | 2 - 200 |
| 1050° F. +, Wt. % | 0 - 100 | 1 - 50 |
| Asphaltenes (C$_5$ insolubles), Wt. % | 0 - 30 | 1 - 20 |
| Con. Carbon, Wt. %. | 0 - 30 | 0.5 - 20 |

Typical and preferred process conditions are tabulated for convenience, as follows:

| | Typical Range | Preferred Range |
|---|---|---|
| Temperature, ° F., E.I.T.[1] | | |
| Start-of-Run | 600 - 675 | 650 -700 |
| End-of-Run | 725 -825 | 730 -800 |
| Pressure, psi | 400 -10,000 | 500 -3000 |
| Hydrogen Rate, SCF/B | 500 -10,000 | 1000 -4000 |
| Space Velocity, LHSV | 0.05 -5.0 | 0.08 -1.0 |

[1]Equivalent Isothermal Temperature (E.I.T.)

At such conditions products having the following characteristics are produced:

| | Typical Range | Preferred Range |
|---|---|---|
| Gravity, ° API | 10 - 35 | 15 - 28 |
| Sulfur, Wt. % | 0.001 -0.6 | 0.01 -0.3 |
| Nitrogen, Wt. % | 0.0002 -0.15 | 0.002 -0.2 |
| Heavy Metals (Ni & V), ppm | 0 - 100 | 0 - 20 |
| 1050° F.+, Wt. % | 0 - 80 | 0 - 20 |
| Asphaltenes (C$_5$ insolubles), Wt. % | 0 - 15 | 0 - 10 |
| Con. Carbon, Wt. % | 0 - 15 | 0 - 8 |

The reasons for the outstanding effectiveness of the catalysts of this invention for hydrodesulfurizing sulfur-containing hydrocarbon feeds are not completely understood and while Applicant has no desire to be bound by any specific theory of mechanism, it is believed that the results achieved are, at least in part, reasonably susceptable to explanation. It is Applicant's belief, based on data which he has obtained, that a correlation exists between the molecular size of the sulfur bearing molecules and the pore size openings within the catalyst, and that a generally optimum size exists between the size of the sulfur bearing molecules and the pore size openings of the catalyst. Thus there exists in a catalyst, on the one hand, an intraparticle diffusion rate limitation whereby relatively large sulfur-containing feed molecules cannot enter the pores of the catalyst if they are too small. And, on the other hand, if the catalyst pores are of excessive diameter such that they permit not only the entry of sulfur-containing feed molecules, but also larger organo-metallic or metals-bearing molecules which enter, decompose, and deposit metals within the pores. Applicant's catalyst, as regards pore size distribution, is unique, e.g., as contrasted with the Adams et al catalyst. The Adams et al catalyst contains a maximum of pore size diameters within the 30A to 80A pore size range which, Applicant has found, excludes perhaps 70-80% of the asphaltene components of the heavier feeds characterized above, this limiting the accessibility of the molecules to catalytic sites and consequently the ability of the catalyst to desulfurize heavy asphaltic residua feeds. In accordance with the present invention, it is found that considerably higher desulfurization can be achieved by maximization of pores within the 70A to 160A range. Openings smaller than 70A are minimized since they have only a limited ability to permit effective ingress of the sulfur bearing molecules. Pore size openings ranging above 160A are also minimized because the larger openings permit ingress of metals-bearing molecules which lessen desulfurization, suppress active catalytic sites and decrease the activity maintenance of the catalyst. The formation of pores of diameters below about 70A, and above about 160A, are thus both suppressed, the elimination of pores of these size ranges permitting an even greater concentration of pores within the desired 70A – 160A range.

The invention will be better understood by reference to the following non-limiting examples and comparative data which illustrate its more salient features.

In the examples side-by-side runs were made to provide direct comparisons of the desulfurization activity between runs conducted with the catalysts of this invention vis-a-vis runs conducted with similar feeds at similar conditions with catalysts of different pore size distributions.

The pore size chracteristics of these several catalysts, viz. Catalysts A, B, C, D and E, are graphically depicted by reference to the attached FIGURE wherein the pore radius in Angstrom units is plotted on the X-axis and dV/D log R, which is a measure of cumulative pore volume, is plotted on the Y-axis. Catalysts B and C are catalysts of this invention.

In conducting a run, a previously prepared catalyst was first calcined at 1000° F. for 2 hours. Portions of the catalyst were then charged to the different reactors, and each was then sulfided at atmospheric pressure using a gas mixture, 10 percent hydrogen sulfide in hydrogen. The sulfiding treatment was conducted at 750° F. for 16 hours. When sulfiding was completed, the petroleum residuum feed was passed into the reactor at 750° F.

EXAMPLES 1 – 4

A Cold Lake petroleum feed, characterized in Table I, below, was preheated to reaction temperature, and concurrently fed, with hydrogen, at the same temperature, downwardly through each of a series of reactors, each of which contained a series of spaced apart fixed beds of sulfided CoMoAl$_2$O$_3$ catalyst. The process was run at a temperature of 750°–775° F. and under a pressure of 2250 psig. The feed rate was maintained at 0.5 V/V/Hr., hydrogen was fed at a rate of 4000–6000 SCF/Bbl., and the runs were conducted over a period of 600 hours, and longer.

The petroleum feed injected into each of the reactors is characterized as follows:

TABLE I

| FEEDSTOCK INSPECTIONS | |
| --- | --- |
| Inspections | |
| Gravity, ° API | 11.1 |
| Sulfur, Wt. % | 4.5 |
| Nitrogen, Wt. % | 0.459 |
| Oxygen, Wt. % | 0.2 |
| Con. Carbon, Wt. % | 12.0 |
| Asphaltenes (C$_5$), Wt. % | 17.9 |
| Carbon, Wt. % | 83.99 |
| Hydrogen, Wt. % | 10.51 |
| Metals, ppm | |
| Ni | 74 |
| V | 180 |
| Fe | |
| Na | 18 |
| Solids (3 micron-filter) | 92 |
| VSU at 210° F. | 78 |
| D-1160 | |
| IBP | 463 |
| 5 | 565 |
| 10 | 622 |
| 20 | 712 |
| 30 | 817 |
| 40 | 916 |
| 50 | 1019 |
| % Rec. | 56.4 |
| % Res. | 42.4 |
| Light Ends | 1.2 |

The catalyst employed in each of the reactors is characterized as follows:

TABLE II

| Catalyst | A | B | D | E |
| --- | --- | --- | --- | --- |
| Composition, Wt. % | | | | |
| CoO | 3.5 | 6.0 | 6.0 | 6.0 |
| MoO$_3$ | 12.0 | 24.0 | 24.0 | 24.0 |
| SiO$_2$ | 1.0 | 0.0 | 0.0 | 0.0 |
| Al$_2$O$_3$ | 83.5 | 70.0 | 70.0 | 70.0 |
| Physical Properties | | | | |
| Surface Area, m$^2$/g | 246 | 246 | 263 | 253 |
| Pore Volume, cc/g | 0.48 | 0.61 | 0.89 | 1.4 |
| Pore Distribution: | | | | |
| 0 – 50A | 19.2 | 3.7 | 0.0 | 1.6 |
| 50 – 70A | 27.5 | 8.5 | 0.0 | 2.2 |
| 70 – 160A | 46.6 | 57.2 | 16.1 | 11.5 |
| 160 – 200A | 2.4 | 17.2 | 15.9 | 5.2 |
| 200A+ | 4.3 | 13.4 | 68.0 | 79.4 |

The results obtained are given as follows:

TABLE III

| Liquid Product | | | | |
| --- | --- | --- | --- | --- |
| Sulfur, Wt. % | 2.37[1] | 0.4 | 0.57 | 0.78 |
| | (2.33)[2] | (0.26)[3] | (0.46)[3] | (0.61)[3] |
| % HDS | 44 | 90.9 | 87.0 | 82.0 |
| | (44)[2] | (94.0)[3] | (90.5)[3] | (86.0)[3] |

[1]Data obtained at 727° F., 0.5 V/V/Hr. after 1000 hours operation.
[2]Data obtained at 775° F., 1.0 V/V/Hr. after 1400 hours operation.
[3]Data obtained at 775° F. with high gas rates after 1050 hours operation.

From these data it is evident that the catalyst of this invention, as represented by Catalyst B, is far more effective as a hydrodesulfurization catalyst than any of the other catalysts.

EXAMPLES 5 and 6

In a further series of runs Catalyst C, the catalyst of this invention, is compared with Catalyst A utilizing an even heavier petroleum hydrocarbon feed. Catalysts A and C, both of which are comprised of a mixture of Cobalt and molybdenum composited with an alumina base, are characterized in Table IV, below:

TABLE IV

| Catalyst | A | C |
| --- | --- | --- |
| CoO, Wt. % | 3.5 | 5.0 |
| MoO, Wt. % | 12.0 | 22.0 |
| SiO$_2$, Wt. % | 1.0 | 0.0 |
| Al$_2$O$_3$, Wt. % | 83.5 | 73.0 |
| Pore Size Dist.: | | |
| 0 – 50A | 19.2 | 0 |
| 50 – 70A | 27.5 | 0 |
| 70 – 160A | 46.6 | 95.7 |
| 160 – 200A | 2.4 | 0.0 |
| 200A+ | 4.3 | 4.3 |
| Pore Volume, cc/g | 0.61 | 0.76 |
| Surface Area, m$^2$/g | 246 | 321 |

The product inspections on the feed, a Jobo petroluem crude, is as follows:

| FEEDSTOCK INSPECTIONS | |
|---|---|
| Inspections | |
| Gravity, °API | 8.5 |
| Sulfur, Wt. % | 3.8 |
| Nitrogen, Wt. % | 0.684 |
| Oxygen, Wt. % | 0.57 |
| Con. Carbon, Wt. % | 13.8 |
| Asphaltenes ($C_5$), Wt. % | 17.7 |
| Carbon, Wt. % | 83.92 |
| Hydrogen, Wt. % | 10.49 |
| Metals, ppm | |
| Ni | 97 |
| V | 459 |
| Fe | 10 |
| Na | 180 |
| Solids (3 micron-filter) | 386 |
| VSU at 210° F. | 247 |
| D-1160 | |
| IBP | 518 |
| 5 | 629 |
| 10 | 682 |
| 20 | 798 |
| 30 | 895 |
| 40 | 978 |
| 50 | 1037 |
| % Rec. | 50.8 |
| % Res. | 48.2 |
| Light Ends | 1.0 |

The results of these runs, which were conducted at 700° F., 2200 psig and 1 V/V/Hr. are given as follows:

| Catalyst | A | C |
|---|---|---|
| Sulfur Activity | 0.23 | 0.52 |
| Hours on Stream | 500 | 500 |

It is clear that Catalyst C, the catalyst of this invention, is more active and has better activity maintenance than Catalyst A.

It is apparent that various modifications can be made in the condition of operation, the precise nature of the feed and catalyst compositions, and the like, without departing the spirit and scope of the invention.

Pore size distributions, as percent of total pore volume, for purpose of the present invention are measured by nitrogen adsorption wherein nitrogen is adsorbed at various pressures using the Aminco Adsorptomat Cat. No. 4-4680, and multiple sample accessory Cat. No. 4-4685. The detailed procedure is described in the Aminco Instruction Manual No. 861-A furnished with the instrument. A description of the Adsorptomat prototype instrument and procedure is given in Analytical Chemistry, Volume 32, Page 532, April, 1960.

An outline of the procedure is given here, including sample preparation.

From 0.2 to 1.0 g. of sample is used and the isotherm is run in the adsorption mode only. All samples are placed on the preconditioner before analysis where they are out-gassed and dried at 190° C. under vacuum ($10^{-5}$ torr) for 5 hours. After pretreatment the weighed sample is charged to the Adsorptomat and pumped down to $10^{-5}$ torr. At this point, the instrument is set in the automatic adsorption mode to charge a standard volume of gas to the catalyst. This is done by charging a predetermined number of volumes as doses and then allowing time for adsorption of the nitrogen to reach equilibrium pressure. The pressure is measured in terms of its ratio to the saturation pressure of boiling liquid nitrogen. Three doses are injected and 8 minutes allowed for equilibration of each measured relative pressure. The dosing and equilibration are continued until a pressure ratio of 0.97 is exceeded and maintained for 15 minutes. The run is then automatically terminated.

The data obtained with the dead space factor for the sample, the vapor pressure of the liquid nitrogen bath, and the sample weight are sent to a digital computer which calculates the volume points of the isotherm, the BET area, and the pore size distribution of the Barrett, Joyner, and Halenda method. [Barrett, Joyner, and Halenda, J. Am. Chem. Soc. 73, p. 373.] It is believed that the Barrett, Joyner, and Halenda method is as complete a treatment as can be obtained, based on the assumptions of cylindrical pores and the validity of the Kelvin equation.

Having described the invention, what is claimed is:

1. A process for the hydrodesulfurization of a hydrocarbon feed which comprises
    contacting said feed with hydrogen and a catalyst characterized as comprising a composite of an alumina support stabilized with up to 6% silica and from about 5 to about 30 percent by weight of a Group VIB metal, metal oxide or metal sulfide thereof and from about 1 to about 12 percent by weight of a Group VIII metal, metal oxide or metal sulfide thereof, the percents by weight being calculated on said composite, said catalyst being further characterized as follows:

| Distribution of Pore Diameter measured by nitrogen adsorption isotherm | |
|---|---|
| 0 - 50Å | <1 |
| 50 - 70Å | <24 |
| 70 - 160Å | >70 |
| 160 + 200Å | <5 |
| 200Å+ | |
| Pore Volume, cc/g | 0.4 - 0.9 |
| Surface Area, m²/g | 200 - 400 |

2. The process of claim 1 wherein the catalyst is characterized as follows:

| Distribution of Pore Diameter | |
|---|---|
| 0 - 50Å | 0 |
| 50 - 70Å | <8 |
| 70 - 160Å | >90 |
| 160 +200Å | <2 |
| 200Å+ | 0 |
| Pore Volume, cc/g | 0.5 - 0.8 |
| Surface Area, m²/g | 250 - 350 |

3. The process of claim 1 wherein the Group VIB metal is tungsten or molybdenum.

4. The process of claim 1 wherein the Group VIII metal is cobalt or nickel.

5. The process of claim 2 wherein the Group VIB metal is tungsten or molybdenum.

6. The process of claim 2 wherein the Group VIIIB metal is cobalt or nickel.

* * * * *